United States Patent [19]
Jensen et al.

[11] Patent Number: 6,059,341
[45] Date of Patent: May 9, 2000

[54] QUARTER SIDE STORAGE COMPARTMENT

[75] Inventors: Thomas Charles Jensen, Clarkston; David K Rock, Washington; James L Turner, Clinton Township, all of Mich.

[73] Assignee: General Motors Corporation, Detroit, Mich.

[21] Appl. No.: 09/413,165

[22] Filed: Oct. 7, 1999

[51] Int. Cl.[7] .................................................. B60R 5/04
[52] U.S. Cl. ........................ 296/37.6; 292/29; 296/37.1
[58] Field of Search .............................. 296/37.6, 37.1, 296/57.1, 183; 292/29, 53, 56, 336.3

[56] References Cited

U.S. PATENT DOCUMENTS

| | | |
|---|---|---|
| 527,339 | 10/1894 | Lins . |
| 1,990,757 | 2/1935 | Stiles ........................................ 296/28 |
| 3,082,033 | 10/1961 | Bosher . |
| 3,085,826 | 6/1960 | Carreau . |
| 3,245,713 | 4/1966 | Ogilvie ..................................... 296/24 |
| 3,668,907 | 6/1972 | Pastya, Jr. ................................ 70/153 |
| 4,135,761 | 1/1979 | Ward ..................................... 296/37.6 |
| 4,438,964 | 3/1984 | Peters ...................................... 292/216 |
| 4,685,695 | 8/1987 | LeVee ..................................... 280/423 |
| 4,789,195 | 12/1988 | Fletcher ................................. 296/37.1 |
| 4,861,096 | 8/1989 | Hastings ................................. 296/183 |
| 4,911,487 | 3/1990 | Rachocki ................................ 292/216 |
| 4,998,758 | 3/1991 | Kowalczyk et al. ................... 292/201 |
| 5,233,849 | 8/1993 | Forbers ..................................... 70/526 |
| 5,253,917 | 10/1993 | Brueggemann ........................ 296/218 |
| 5,267,773 | 12/1993 | Kalis, Jr. et al. ...................... 296/183 |
| 5,324,089 | 6/1994 | Schlachter ............................. 296/37.5 |
| 5,421,645 | 6/1995 | Young .................................... 312/108 |
| 5,567,000 | 10/1996 | Clare ..................................... 296/37.6 |
| 5,784,769 | 7/1998 | Clare ..................................... 29/401.1 |
| 5,816,630 | 10/1998 | Bennett et al. ..................... 292/341.17 |
| 5,819,390 | 10/1998 | Clare ....................................... 29/430 |
| 5,823,598 | 10/1998 | Clare et al. ........................... 296/37.6 |

*Primary Examiner*—Dennis H. Pedder
*Assistant Examiner*—Mickk D. Murray
*Attorney, Agent, or Firm*—Jeffrey A. Sedlar

[57] ABSTRACT

A quarter side storage compartment accessible from outside the vehicle includes a simplified operating arrangement. The vehicle's endgate is used as an impediment to operation of the compartment latch's release handle. The release handle is positioned so that actuation thereof is not possible without opening the endgate. Preferably, but not necessarily, the endgate is lockable in the closed position, meaning that advantageously, the release handle does not require an individual lock.

14 Claims, 6 Drawing Sheets

QUARTER SIDE STORAGE COMPARTMENT

TECHNICAL FIELD

The present invention relates to a quarter side storage compartment, and more particularly, to a storage compartment provided in the rear quarter of a pickup, that is accessible from outside the vehicle.

BACKGROUND OF THE INVENTION

Storage compartments accessible through side panels of vehicles are extremely well known. For example, U.S. Pat. No. 1,990,757 issued Feb. 12, 1935 to Stiles from an application filed Apr. 15, 1933, and describes hinging various body panels to afford access to storage compartments. Although this type of storage compartment became increasingly popular during the effective period of the Eighteenth Amendment to the U.S. Constitution (1919–1933), when lack of detection was paramount, the concept of providing exterior access to storage compartments was popular long before vehicles became motorized and was commonly employed on carriages and wagons as evidenced by U.S. Pat. No. 527,339, which issued Oct. 9, 1894 to Lins from an application filed Jul. 11, 1894. More recently, utility vehicles, RV's and buses have generally included storage compartments that are accessible from outside the vehicle. Within the context of pickup trucks, U.S. Pat. No. 4,135,761 issued to Ward on Jan. 23, 1979 from an application filed Apr. 14, 1977. Ward discloses that this type of compartment may be constructed as original equipment at the factory or done as a conversion using the original outer sidewall.

Typically, vehicle storage compartment doors use rotary paddle latches like the one described in U.S. Pat. No. 3,668,907, which issued on Jun. 13, 1972 to Pastva from an application filed Feb. 19, 1971. For added security of outside accessible compartments, the widely employed conventional solution is to add a lock mechanism for the storage compartment's operable panel, included as part of the latch release handle assembly. A drawback of that type of arrangement is that a separate lock must be provided for each latch release handle assembly. It also means that each compartment must be unlocked separately. An alternative suggested in the prior art is to place the latch release inside the vehicle. However, this tends to be inconvenient when the compartment is accessed from outside the vehicle, and the individual seeking access is also outside. Additionally, in a typical assembly operation for a pickup, the cab and box are married to the chassis as separate components, and in individual albeit related operations. Therefore, the addition of a latch release cable that extends between the cab and box complicates assembly and is not preferred. Accordingly, a simplified locking arrangement is needed.

SUMMARY OF THE INVENTION

Aspects of the invention reside in a quarter side storage compartment and in a simplified operating arrangement for such vehicle based storage compartments that are accessible from outside the vehicle. A preferred exemplary embodiment of the present invention described here as an aid in readily conveying the nature of the invention, uses the endgate of a pickup as an impediment to operation of the handle that releases the compartment latch. The release handle is positioned so that actuation thereof is not possible without opening the endgate. Preferably, but not necessarily, the endgate is lockable in the closed position, meaning that advantageously, the release handle does not require an individual lock. Also preferably, the upper wall of the storage compartment is provided in a seamless manner over the rail area of the utility box. Other aspects of the invention are described below.

BRIEF DESCRIPTION OF THE DRAWINGS

The present invention will now be described by way of example, with reference to the accompanying drawings in which.

DESCRIPTION OF THE PREFERRED EMBODIMENT

Figure 1:
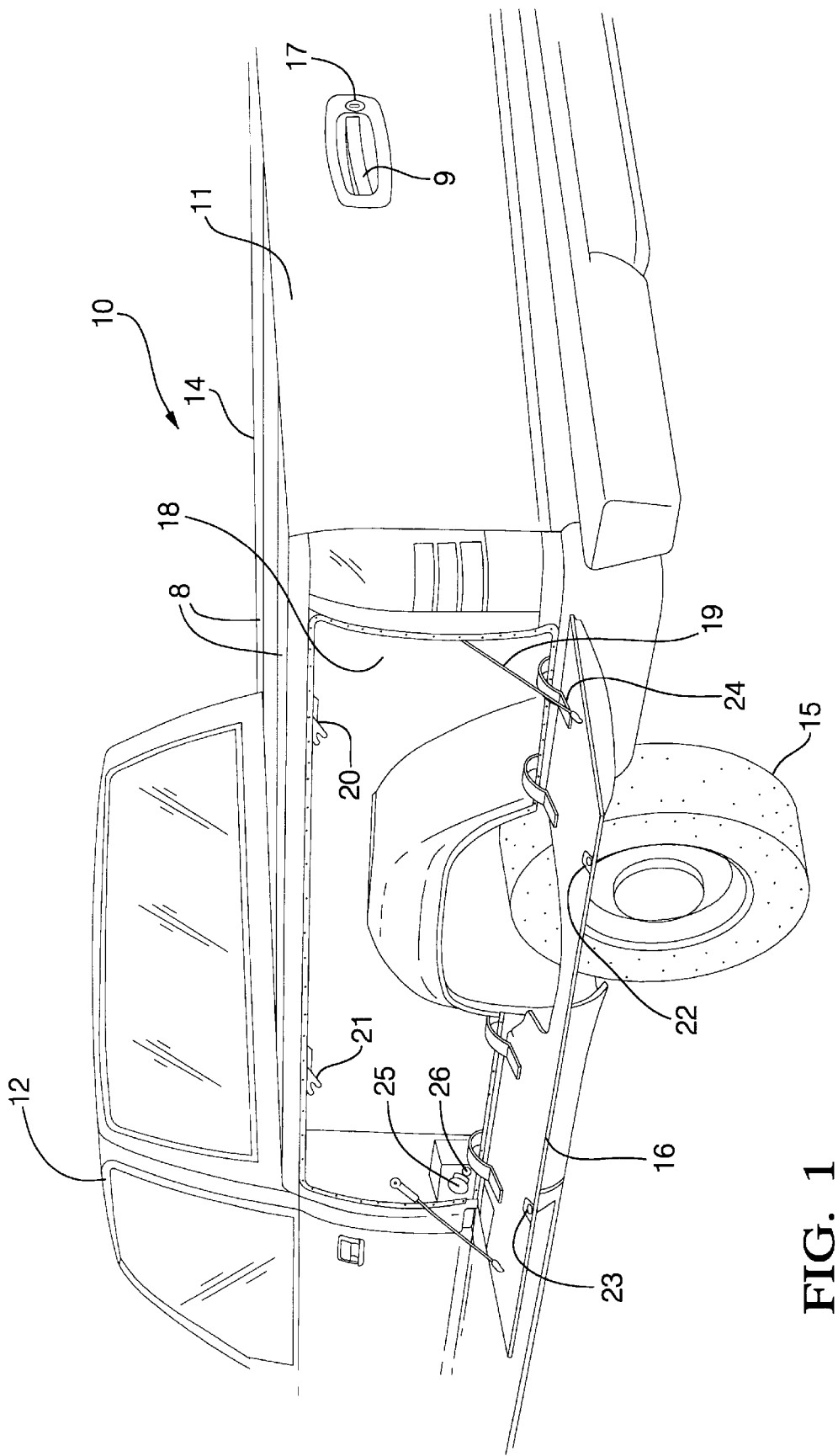
FIG. 1 is fragmentary perspective schematic view of a pickup with a storage compartment on the side of the utility box shown in an open condition.

Referring to the drawings, FIG. 1 shows a pickup 10 having a cab portion 12 and a cargo box portion 14, both assembled on a common chassis that is suspended on wheel(s) 15. The cargo box portion 14 includes side rail areas 8, an endgate 11 and at least one quarter side panel 16 that is operable to conceal and reveal a storage compartment 18. Preferably, a similar panel is provided on the opposite side of the cargo box portion 14. The bottom of panel 16 is connected to the cargo box portion 14 by a plurality of hinges 24, and a pair of cables 19 suspend the panel 16 in a substantially horizontal position when fully open. The storage compartment 18 holds a pair of latch assemblies 20 and 21 that are similar to well known trunk type latches of the kind depicted in U.S. Pat. Nos. 4,998,758 and 5,233,849. The latch assemblies 20 and 21 include typical bolts that mate with strikers 22 and 23 to hold the panel 16 in a closed position and when rotated, release the strikers 22, 23 to allow opening of panel 16. The hinges 24 are located sufficiently outboard and the center of gravity of panel 16 is oriented such that when the latches 20, 21 are released, the weight of the panel 16 does not cause it to drop, but rather panel 16 advantageously remains substantially vertical until the top of the panel 16 is manually pulled away from the rail area 8.

The endgate 11 is lockable, which can be accomplished in the manner of commonly assigned U.S. patent application Ser. No. 09/066,498, Filed Apr. 24, 1998, which is specifically incorporated herein by reference. The endgate 11 includes a handle assembly 9, used to open the endgate 11 and a lock cylinder 17 used to inhibit the use of handle 9 to open the endgate 11. Also shown in FIG. 1 is the fuel fill area 25 including a key cylinder 26 that upon actuation, releases the latches 20 and 21 electrically, so that the panel 16 can be opened. Wiring (not shown), is provided from a power source and between the key cylinder 26 and the latches 20, 21, which use solenoids, motors, or other actuators to enable operation. Optionally, the key cylinder operates the latches 20, 21 through a mechanical cable connection, in a manner known in the art. A fuel fill door is used to cover the fuel fill area 25.

Figure 2:
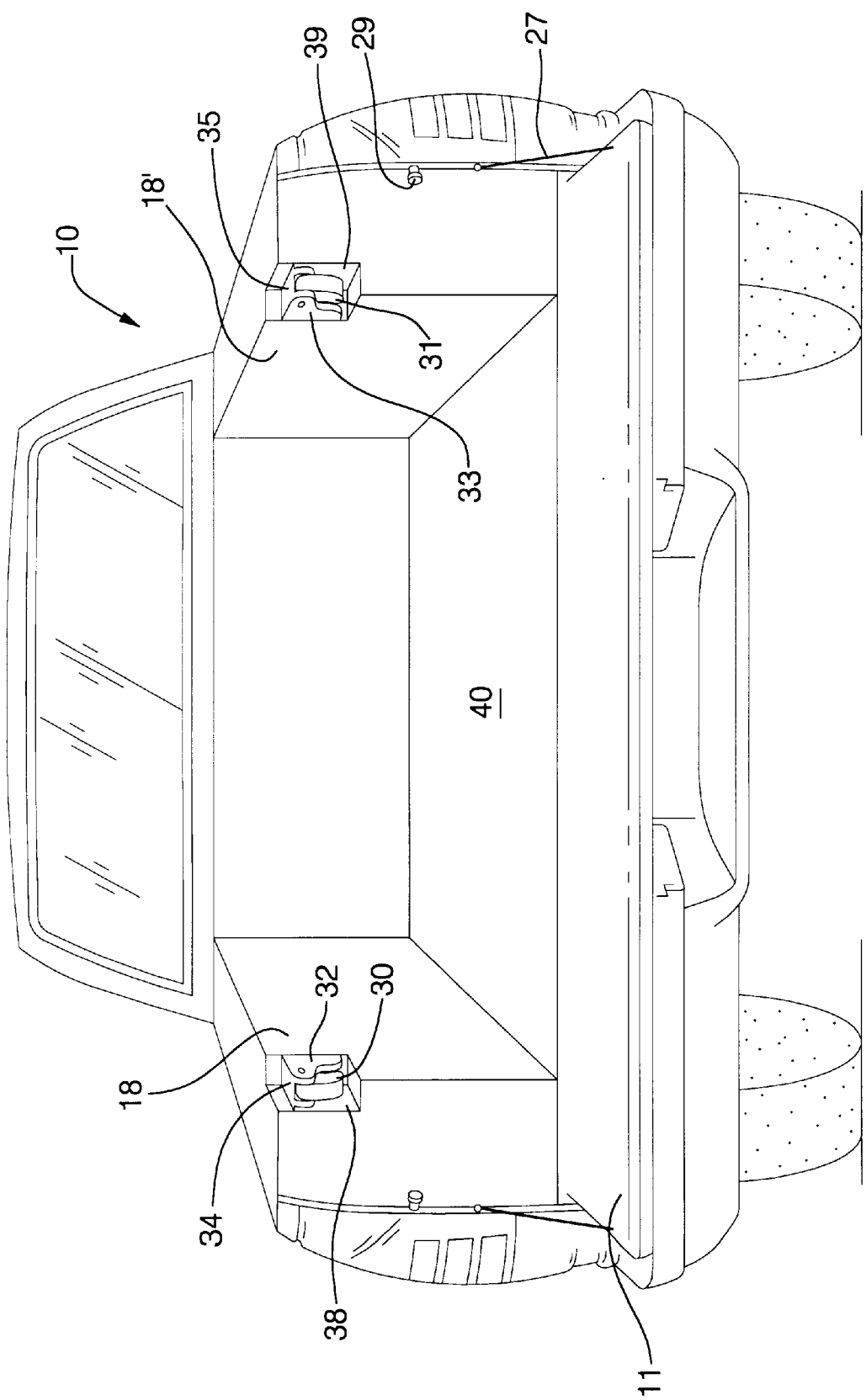
FIG. 2 is a perspective schematic view of the pickup of FIG. 1 shown from the rear with the endgate in an open condition.

FIG. 2 shows the pickup 10 from behind with the endgate 11 open and the quarter side panel(s) 16 closed. A pair of cables 27 suspend the endgate 11 in a substantially horizontal position when fully open, as is typical in the art, and a pair of strikers 29 are provided to hold the endgate in a closed position. The quarter side panels 16 are individually opened by rotation of the bolts in latches 20, 21, which is effected by movement of a cable upon pulling the pistol-grip handles 30 and 31. The handles 30, 31 are carried in assemblies that include side walls 32, 33 that are wider at their upper portions for supporting handle pivot pins and are narrower at their lower portions for ease in accessing the handles 30, 31 by hand. Similar side walls can be located on the outboard sides of the handles 30, 31 or the adjacent structure of the pickup can be utilized to support the pivot pins. Additionally, the assemblies include upper walls 34, 35 that conceal an otherwise open area of the assemblies to inhibit the entry of debris, snow, etc. that could interfere with operation of the handles 30, 31. The upper walls 34, 35 are exposed from above, meaning ambient conditions such as wind and sunshine can help to deplete ice build-up.

The handle assemblies are located in rectangular pockets 38, 39 that are positioned at the extreme rear, inboard, upper corner of the storage compartments 18, 18'. The result is that routing cables from the handles 30, 31 to the latches 20, 21, is convenient since they are also at the top of the storage compartment. The location of pockets 38, 39 also means that an individual can reach the handles 30, 31 easily, since the inboard side is exposed to the open bed area 40 of the pickup 10. Leaving the inboard sides exposed results in a situation where the handles are accessible, even when the endgate is closed.

Figure 3:
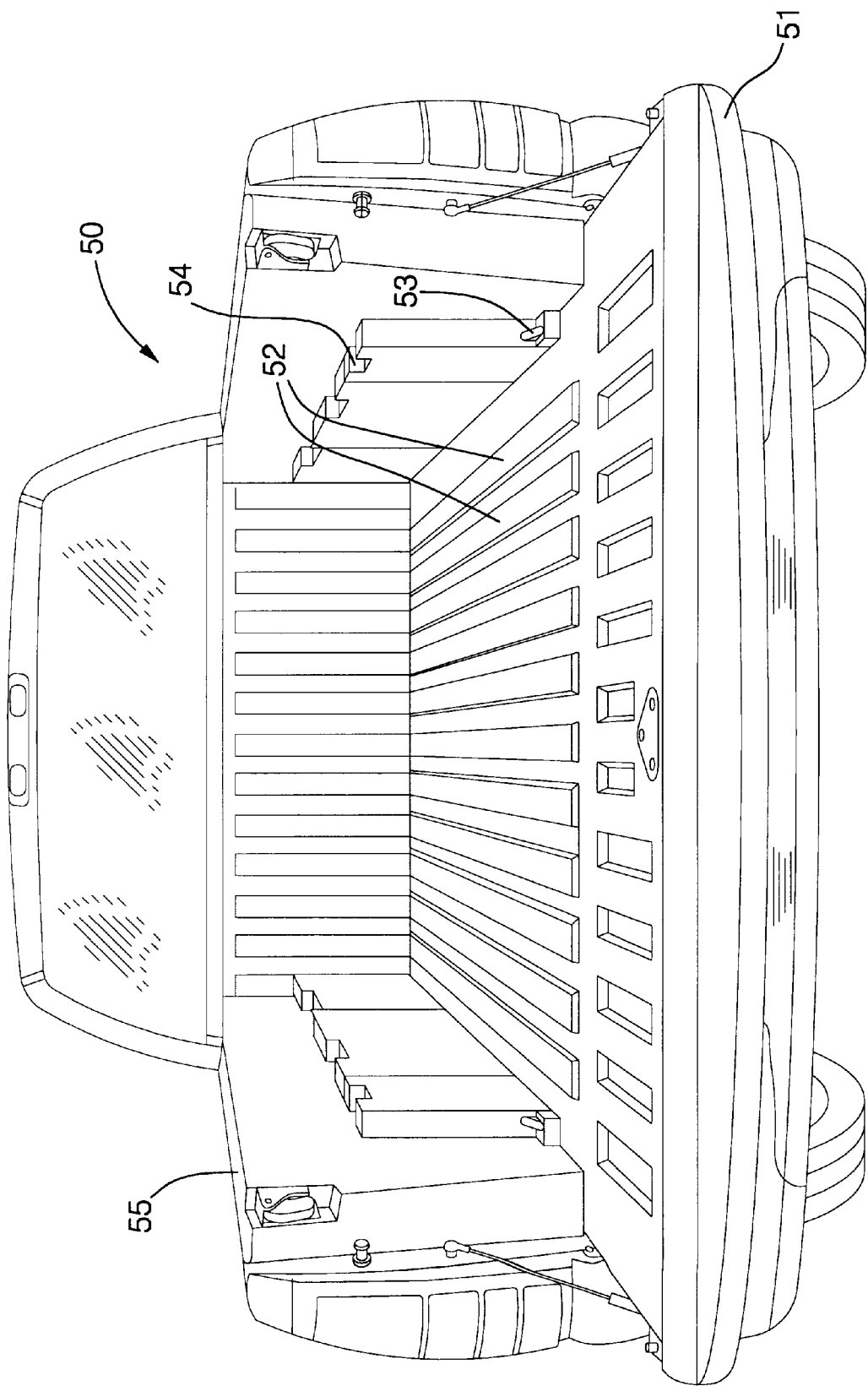
FIG. 3 is a perspective view of a pickup according to the present invention shown from the rear with the endgate in an open condition.

Referring, to FIG. 3 a more detailed illustration of a pickup 50 is shown from behind with the endgate 51 open and the quarter side panel(s) closed. The bed area is provided with a full compliment of typical features such as a resilient material surface with longitudinal ribs 52, tie-downs 53 and beam pockets 54 for adding an elevated load floor (not shown). It can also be seen that the upper walls 55, 56 of the storage compartments are at the same height as the rail areas 8 so that the surface is continuous, smooth and free of longitudinal seams. Constructing the utility box of a composite material facilitates that result. Composite pickup boxes are described in commonly assigned U.S. Pat. Nos. 4,998,769, issued Mar. 12, 1991; 5,228,742, issued Jul. 20, 1993; and 5,249,834, issued Oct. 5, 1993.

Figure 4:
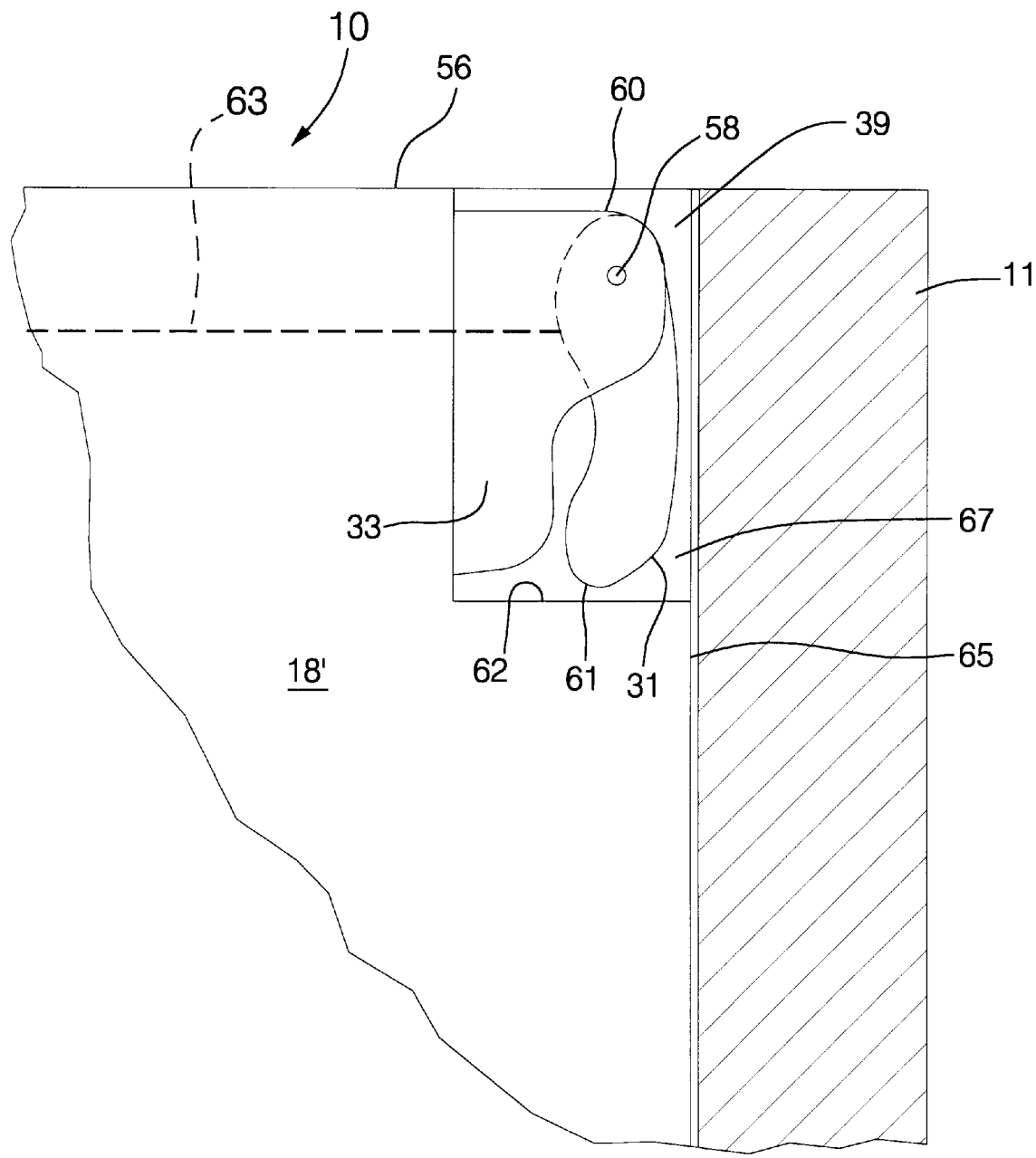
FIG. 4 is a schematic detail illustration of the release handle area of the pickups of FIGS. 1–3 with the endgate in a closed condition.
Figure 5:
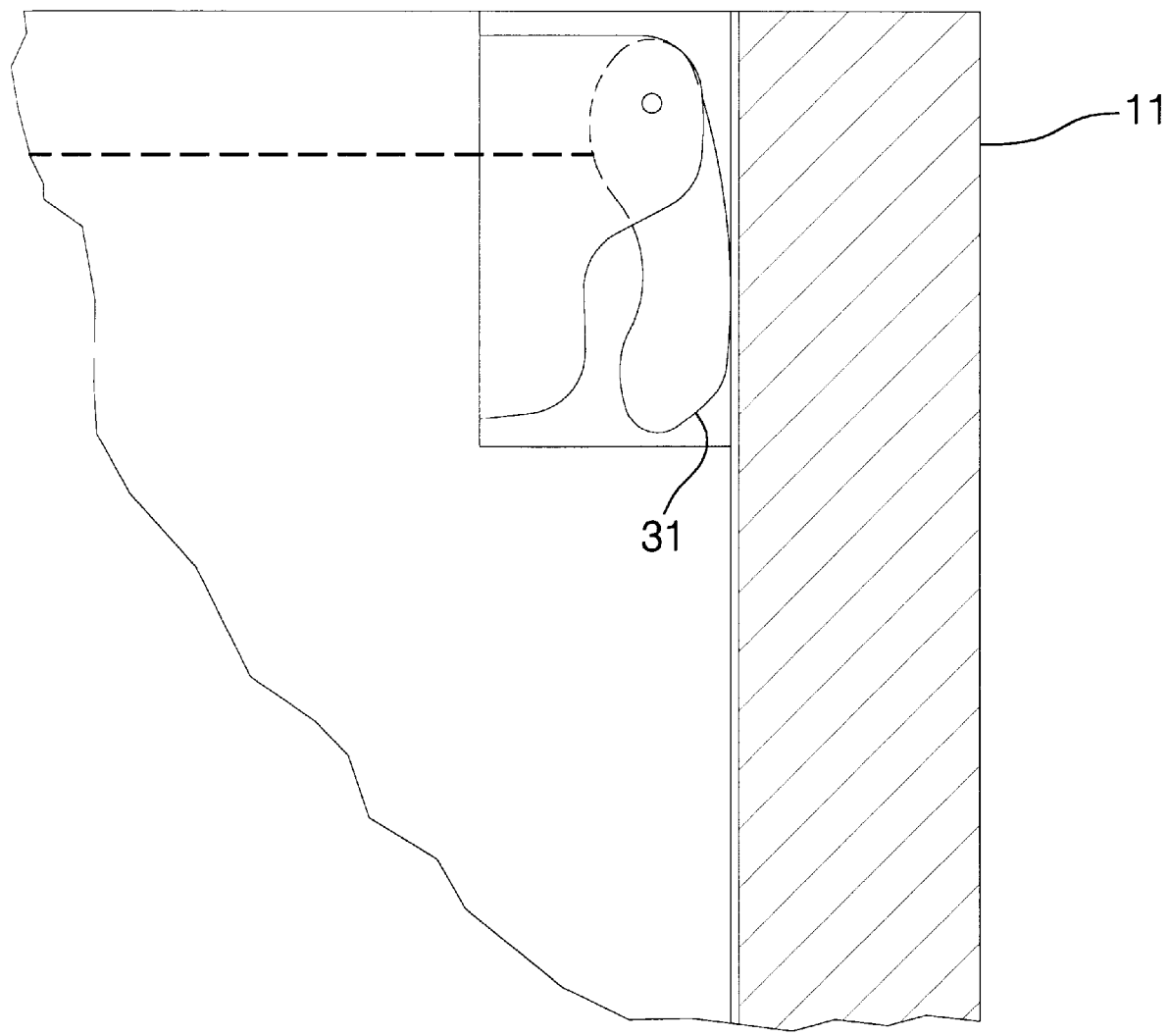
FIG. 5 is a schematic detail illustration of the release handle area of the pickups of FIGS. 1–3 with the endgate in a closed condition.

FIG. 4 shows a schematic of the area around handle 31 viewed from inside the bed area of pickup 10 with the endgate 11 closed. The handle 31 depends from pivot pin 58 so that its upper end 60 is near the level of upper wall 56, and its lower end 61 is near the bottom 62 of pocket 39. The pivot pin 58 is engaged in side wall 33. A cable 63 engages handle 31 below pivot pin 58 but nearer end 60 than end 61. Cable 63 extends to the storage compartment latches. The endgate 11 is in close proximity to the back wall 65 of storage compartment 18' when in its closed position, as shown. In this case the terms close proximity mean that the handle 31 may rotate a small amount when the endgate 11 is closed, as shown in FIG. 5, but, it will not rotate a sufficient amount to release the latches. Optionally, when closed the endgate 11 can be positioned adjacent the handle 31. However, leaving a small space prevents damage to the handle assembly when the endgate 11 is slammed closed.

Figure 6:
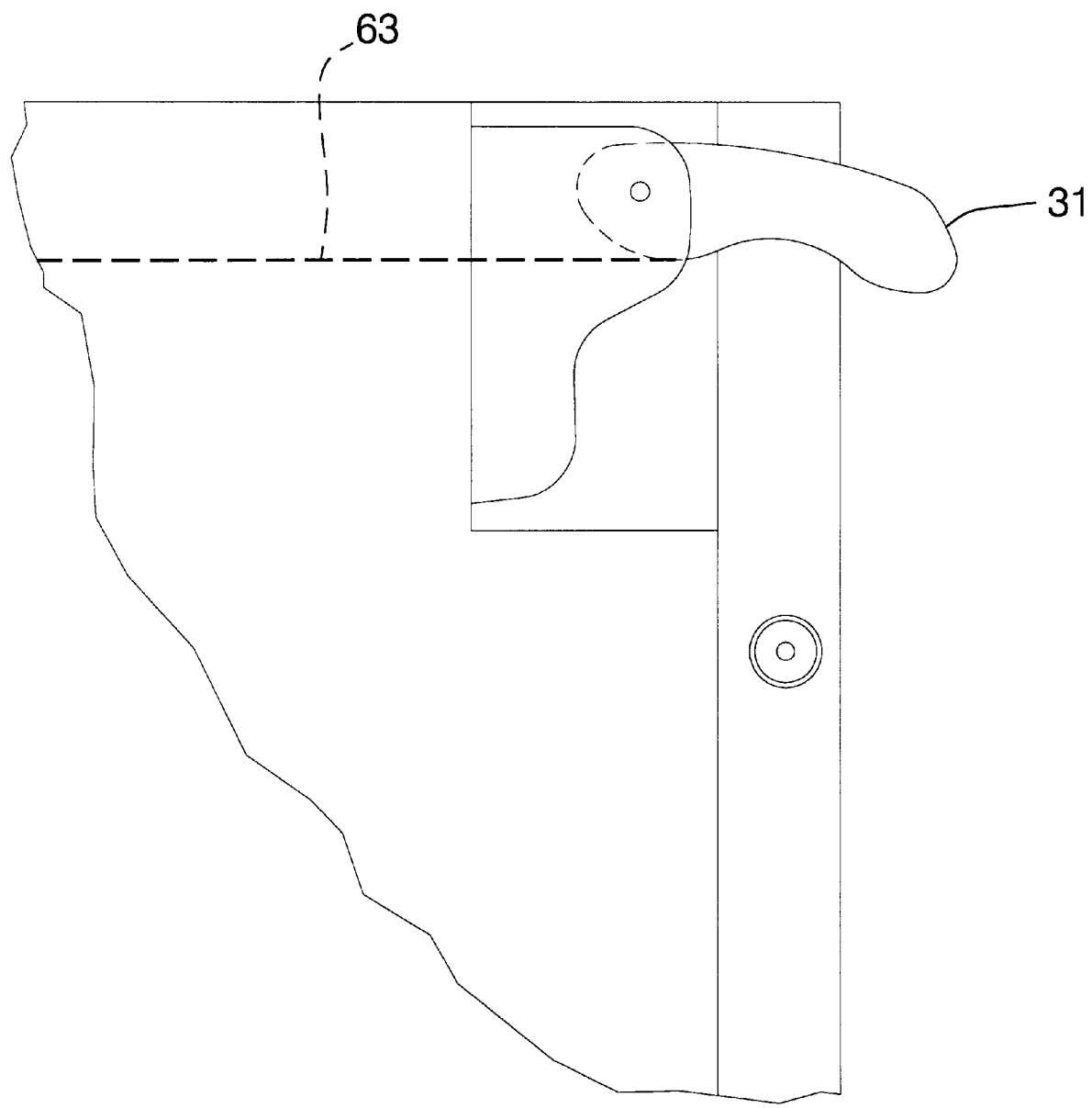
FIG. 6 is a schematic detail illustration of the release handle area of the pickups of FIGS. 1–3 with the endgate in an open condition.

Therefore, a gap 67 (shown in FIG. 4), is provided between the plane of back wall 65 and the rearmost point of the handle assembly. As shown in FIG. 6, when the endgate 11 is open, the handle 31 is rotatable so that the cable 63 is translated a sufficient amount to release the latches.

Thus, the invention has been described in a typical manner by referencing at least one specific embodiment of the many that are possible for a quarter side storage compartment that is accessible from outside the vehicle with a simplified operating arrangement, wherein the endgate of a pickup is used as an impediment to operation of the release handle of the compartment latch.

What is claimed is:

1. A vehicle with a storage compartment and an endgate, wherein the storage compartment is accessible from outside the vehicle by opening a panel of the vehicle, wherein the panel is held in a closed condition by at least one latch and is releasable to an open condition by a handle, wherein the endgate is positionable in a closed position that impedes operation of the handle by limiting actuation of the handle to an amount that is insufficient to release the latch, and wherein when the endgate is moved to an open position, the handle is actuatable a sufficient amount to release the latch allowing the panel to be placed in an openable condition.

2. A vehicle according to claim 1 wherein the handle is carried by a side wall with an upper portion and a lower portion, wherein the upper portion is wider than the lower portion so that the handle is exposed on a side and is readily accessible for hand actuation.

3. A vehicle according to claim 1 wherein the storage compartment extends into close proximity with the endgate when the endgate is closed, and wherein the handle is positioned in a pocket of the storage compartment that is located at the extreme upper, rear, and inboard point of the storage compartment.

4. A vehicle according to claim 1 wherein the endgate includes an endgate handle that is actuatable to release the endgate from the closed position and a lock cylinder that is rotatable to inhibit actuation of the endgate handle.

5. A vehicle comprising:
a cargo box with side rails having rear terminal ends, an endgate near the rear terminal ends of the side rails, and a quarter side panel that extends substantially the entire length of the cargo box, with a storage compartment located inboard from the quarter side panel and generally under the side rails, the storage compartment having a rear, inboard, upper corner with a pocket, wherein a handle assembly is positioned in the pocket, the handle assembly including a handle that is rotatable, with a cable engaging the handle and being translatable when the handle is rotated, with a latch that holds the quarter side panel in a closed position, the latch being released when the cable is translated a certain amount, wherein when the endgate is closed, the handle is rotatable no more than an extent that causes the cable to translate an amount that is insufficient to release the latch so that the handle is prevented from opening the quarter side panel when the endgate is fully closed.

6. A vehicle according to claim 5 wherein the handle assembly includes a side wall on an inboard side of the handle, wherein the side wall has an upper portion that is wider than a lower portion so that the handle is exposed on the inboard side and is readily accessible, even when the endgate is fully closed.

7. A vehicle according to claim 5 wherein the handle assembly includes an upper wall that substantially covers the handle assembly and the upper wall is exposed from above.

8. A vehicle according to claim 5 wherein a space exists between the handle and the endgate when the endgate is fully closed.

9. A vehicle according to claim 5 including a cab portion, wherein a fuel fill area is located on the utility box portion near the cab portion, with a key cylinder located in the fuel fill area, wherein rotation of the key cylinder releases the latches.

10. A pickup type vehicle having a cab portion and a utility box portion, the utility box portion including a quarter side panel and a endgate positioned generally at a rear end of the quarter side panel, with a storage compartment located on the utility box portion, the storage compartment having an upper wall that extends over a rail area of the utility box so that when the quarter side panel is closed, a top of the quarter side panel is positioned near a seamless horizontal upper surface of the upper wall and the rail area, and including a handle assembly located in a pocket at a rear, upper, inboard corner of the storage compartment, wherein the handle assembly includes a handle that is rotatable to release the quarter side panel to an open condition, and includes a side wall on an inboard side of the handle, wherein the side wall has an upper portion that is wider than a lower portion so that the handle is exposed on the inboard side and is readily accessible, even when the endgate is fully closed.

11. A vehicle according to claim 10 wherein the handle assembly includes an upper wall that substantially covers the handle assembly and is exposed from above.

12. A vehicle according to claim 11 wherein a space exists between the handle and the endgate, when the endgate is fully closed.

13. A vehicle according to claim 10, wherein a fuel fill area is located on the utility box portion near the cab portion, with a key cylinder located in the fuel fill area, wherein rotation of the key cylinder releases the quarter side panel to an open condition.

14. A pickup type vehicle having a cab portion and a utility box portion, the utility box portion including a quarter side panel and an endgate positioned generally at a rear end of the utility box portion, with a storage compartment located on the utility box portion, the storage compartment having an upper wall that extends across a rail area of the utility box so that when the quarter side panel is closed, a top of the quarter side panel is positioned near a seamless horizontal upper surface of the upper wall and the rail area, the storage compartment having a rear, inboard, upper corner with a pocket, wherein a handle assembly having a handle is positioned in the pocket, the handle assembly including a side wall on an inboard side of the handle, wherein the side wall has an upper portion and a lower portion, wherein the upper portion is wider than the lower portion so that the handle is exposed on the inboard side and is readily accessible, even when the endgate is fully closed, the handle being rotatable, with a cable engaging the handle and being translatable when the handle is rotated, wherein a latch holds the quarter side panel in a closed position and is released when the cable is translated a certain amount, wherein when the endgate is closed, the handle is rotatable no more than an extent that causes the cable to translate an amount that is insufficient to release the latch so that the handle is prevented from opening the quarter side panel when the endgate is fully closed, and wherein when the endgate is opened, the handle is rotatable to release the latch.

* * * * *